(12) United States Patent
Ashihara

(10) Patent No.: US 6,369,747 B1
(45) Date of Patent: Apr. 9, 2002

(54) RADAR APPARATUS

(75) Inventor: Jun Ashihara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,494

(22) Filed: Feb. 23, 2000

(30) Foreign Application Priority Data

Feb. 24, 1999 (JP) ............................................ 11-046055

(51) Int. Cl.[7] .............................. G01S 7/40; G01S 13/93
(52) U.S. Cl. .......................... 342/70; 342/165; 702/183
(58) Field of Search .......................... 342/70, 71, 165, 342/173; 701/29–35; 340/903; 702/183

(56) References Cited

U.S. PATENT DOCUMENTS

| | | | | |
|---|---|---|---|---|
| 2,841,782 A | * | 7/1958 | Ilwain ........................... | 342/70 |
| 4,316,173 A | * | 2/1982 | Matsumura et al. .......... | 342/104 |
| 5,270,720 A | * | 12/1993 | Stove ............................ | 342/174 |
| 5,839,096 A | | 11/1998 | Lyons et al. ................. | 702/183 |
| 5,841,393 A | * | 11/1998 | Saito et al. .................. | 342/165 |
| RE36,095 E | | 2/1999 | Urabe et al. | |
| 6,087,975 A | * | 7/2000 | Sugimoto et al. ............. | 342/70 |

FOREIGN PATENT DOCUMENTS

| | | |
|---|---|---|
| DE | 197 15 999 A1 | 10/1998 |
| EP | 0 840 140 | 5/1998 |

* cited by examiner

Primary Examiner—Ian J. Lobo
(74) Attorney, Agent, or Firm—Armstrong, Westerman & Hattori, LLP.

(57) ABSTRACT

A radar apparatus which can detect an abnormality such as a drop in sensitivity, or a fault in the radar apparatus comprises; a transmission device and a reception device of a beam, and a processing unit for detecting the position of a target object from the transmission signal and the reception signal, and the processing unit comprises a signal separation device, a roadbed reflection analysis device and an abnormality judging device, and the radar apparatus is judged to be abnormal when a reflection signal from a roadbed is not detected by the roadbed reflection analysis device with respect to a low-intensity spectrum signal separated by the signal separation device.

4 Claims, 9 Drawing Sheets

RADAR APPARATUS

BACKGROUND OF THE INVENTION

1. Field of the Invention

The present invention relates to a radar apparatus utilized as a vehicle radar system or the like, and more specifically relates to an abnormality detection method for detecting an abnormality of a radar apparatus, and a radar apparatus using this abnormality detection method.

This application is based on Japanese Patent Application No. Hei 11-046055, the contents of which are incorporated herein by reference.

2. Description of the Related Art

A vehicle radar apparatus has heretofore been made practicable for obstacle detection, detecting an object within a relatively short distance so that, for example, at the time of putting a vehicle into a garage, the vehicle does not collide against an obstacle such as a telegraph pole, a block wall or the like. Moreover, research for making practicable a radar apparatus, which intercepts a target object at a relatively long distance at a high speed and at high accuracy, has been recently promoted as an alarm system for preventing a rear-end collision with a vehicle driving ahead, or a collision at the time of driving a vehicle, other than prevention of a collision against the above described stationary obstacles, or as an adaptive cruise control system (ACC) at the time of so-called auto-cruise.

For example, in the U.S. Pat. No. RE 36,095 by the present applicant, is proposed a multi-beam radar apparatus which uses a high frequency beam in a millimeter-wave band as a transmit-beam. In this publication there is disclosed a radar apparatus which improves the detection accuracy by radiating spatially overlapping beams, using a plurality of transmitter-receiver devices, and changing the combination of the transmitter-receiver devices.

Moreover, in the publication EP 0840140A1 by the present applicant, is proposed a scan beam radar apparatus which uses a high radio frequency in a millimeter-wave band as a transmit-beam. In this publication there is disclosed a method of scanning the radio frequency radiated from a primary radiator by means of a rotating reflective body and converging the reflected beam by a dielectric lens to reduce a spread angle, to thereby radiate the reflective beam in the vehicle driving direction.

However, for example, with the multi-beam radar apparatus, the detection area has an intrinsic detection area defined for each combination of respective transmitter-receiver devices, and the position of a target object. That is, an azimuth angle and a distance with respect to a vehicle are calculated by synthesizing the received data observed for each combination of these transmitter-receiver devices. Therefore, if any one of the plurality of transmitter devices or receiver devices breaks down or deteriorates to impair the sensitivity, the radar apparatus must accurately measure the sensitivity and must appropriately judge the abnormality.

Moreover, for example, with the aforesaid scan beam radar apparatus, a transmitter-receiver circuit normally adopts a pair construction, hence the azimuth error as in the multi-beam radar apparatus is not likely to occur due to deterioration of the transmission circuit or the reception circuit. On the other hand however, the detection sensitivity deteriorates evenly over all directions.

Therefore, it has heretofore been necessary to regularly measure the sensitivity of the radar apparatus and confirm that there is no abnormality therein, such as sensitivity deterioration or the like. This sensitivity measurement however, has been performed by transporting a vehicle mounted with the radar apparatus to a test environment where a reference target is installed, transmitting and receiving a beam to/from the reference target in a state that the vehicle is halted at a predetermined test position, and measuring the reception level. Hence there is a problem that much time and man-hours are required. Moreover, the sensitivity may be impaired due to some reason, and a partial breakdown may be caused in a constituent circuit during the regular check.

Therefore, there has been devised a method for predicting the sensitivity of a radar apparatus from the detection number for the target objects which are detected for a predetermined period of time, for the purpose of detecting abnormalities in a vehicle mounted condition. With this method however, there is a problem in that the abnormality judgement varies widely according to individual conditions such as vehicle travelling state and the road environment for travelling, such that when the target object is not detected within the predetermined period of time, the estimation is not possible (or erroneous judgement is caused). Hence, a radar apparatus has been desired which can measure the sensitivity and judge the abnormality during travelling, without being affected by such individual conditions.

SUMMARY OF THE INVENTION

The present invention has been completed under such a background, and it is an object of the present invention to provide a radar apparatus which detects and judges abnormality of the radar apparatus in the normally used state of a vehicle, without transporting the vehicle to a special environment, and avoids various problems, even if a sensitivity drop or a breakdown of the transmitter-receiver devices occurs.

To solve the above described problems, with the present invention, with a radar apparatus used mounted on a vehicle and having: a beam transmission device (for example, the transmission section 30 in embodiments) for radiating a beam as a transmission signal; a beam reception device (for example, the reception section 40 in the embodiments) for receiving a signal reflected from a target object which is within a radiation range of the radiated beam; and a processing unit (for example, the detection/control section 50 in the embodiments) for detecting the position of a target object from the transmission signal and the reception signal. The processing unit has a roadbed reflection analysis device (for example, the roadbed reflection analysis circuit 51b in the embodiments) for analyzing from among the reception signals, a roadbed reflection signal reflected from a roadbed, and incorporates an abnormality judging device (for example, the abnormality judging circuit 51c in the embodiments) for judging an abnormality of the beam transmission device or the beam reception device, based on the analysis results of the roadbed reflection analysis device.

With the above described construction, the processing unit has a roadbed reflection analysis device for analyzing from among the reception signals being received, a roadbed reflection signal reflected from a roadbed, and the abnormality judging device judges that the beam transmission device or the beam reception device is abnormal, when a reflection signal is not detected from the roadbed by the roadbed reflection analysis device. Hence, abnormality in the radar apparatus can be detected and judged during travelling, without transporting and setting a vehicle in a special measurement environment to measure the sensitivity, and without depending upon the road environment, such as the presence or absence of a target object normally serving as a target of the radar apparatus.

Moreover, with the radar apparatus wherein the processing unit detects the position of the target object by using the transmission signal and the reception signal and performing frequency conversion processing, the processing unit comprises a signal separation device (for example, the signal separation circuit 51a in the embodiment) for separating a low-intensity spectrum signal not higher than a previously set predetermined intensity level, from among the received spectrum signals which have been frequency-conversion processed by the processing unit. The roadbed reflection analysis device preferably analyzes the separated low-intensity spectrum signal as the roadbed reflection signal.

With such a radar apparatus, the reflection signal from the target object normally serving as a target of the radar apparatus is comprehended as a spectrum signal having a certain peak intensity. The position of the target object is calculated by analyzing the spectrum signal having a peak intensity not less than this certain intensity. On the other hand, the reflection signal from the roadbed does not have such a strong peak, and is a power spectrum peculiar to road noise which is dispersed with low intensity. Hence, by separating such a signal not higher than a certain level and analyzing the signal, the roadbed reflection signal can be extracted and analyzed, and an abnormality can be judged by comparing the signal with the roadbed reflection signal data from the power spectrum stored for example in a memory.

Furthermore, the roadbed reflection analysis device is further provided with a correlation calculation device (for example, the correlation calculation circuit 510 in the embodiments) for calculating a correlation value between the low-intensity spectrum signal at an optional one time and the other low-intensity spectrum signal at another time. The abnormality judging device preferably judges an abnormality in the beam transmission device or the beam reception device, based on the calculated correlation value.

Generally, the roadbed reflection signal becomes different depending upon the roadbed situation and the travelling state. If the radar apparatus has normal sensitivity, there exists, within a range travelling the same roadbed, a certain correlation between the roadbed reflection signal (low-intensity spectrum signal) at optional one time and the roadbed reflection signal (the same) at another time. On the other hand, if the radar apparatus does not have normal sensitivity, and has only a noise component, the correlation between the two is observed as being very low. Therefore, with the above described construction wherein the correlation value between low-intensity spectrum signals in very short intervals is calculated by the correlation calculation device, and when the correlation between them is low, this is judged to be abnormal, it can be judged if the transmission and reception sensitivity of the radar apparatus is normal or not in an optional roadbed situation, without storing and comparing a large amount of data in the memory.

Moreover, the vehicle has a vehicle speed detection device (for example, the vehicle speed detection device 58 in the embodiments) for detecting the moving speed of the vehicle, and the roadbed reflection analysis device further has a Doppler calculation device (for example, the Doppler calculation circuit 515 in the embodiments) for calculating the Doppler shift quantity of the received spectrum signal calculated from the moving speed at the one time and the Doppler shift quantity of the received spectrum signal calculated from the moving speed at the other time. Desirably the correlation calculation device calculates the correlation value based on the Doppler shift quantity at the one time and the Doppler shift quantity at the other time.

With the above described construction, the Doppler calculation device respectively detects the moving speed of a vehicle (vehicles own speed) at one time when data sampling is performed for calculating the correlation value, and the vehicles own speed at another time, and calculates the Doppler shift quantity of the received spectrum signal, caused therein due to the respective vehicle speeds at the time of sampling. The correlation calculation device calculates the correlation value based on the relative shift quantity between the two spectra, at the time of calculating the correlation. Hence, even if the vehicles own speed varies between two detection points, by correcting this, the error in the correlation value can be corrected to perform accurate judgement.

Moreover, in the case where the radar apparatus is an FM-CW radar apparatus in the millimeter-wave band, the vehicle has a vehicle speed detection device (for example, the vehicle speed detection device 58 in the embodiments) for detecting the moving speed of the vehicle, and the roadbed reflection analysis device has a Doppler calculation device (for example, the Doppler calculation circuit 515 in the embodiments) for calculating from the detected moving speed of the vehicle, the Doppler shift quantity of the received spectrum signal in a frequency rising section of the transmission signal of the FM-modulated beam and the Doppler shift quantity of the received spectrum signal in a frequency falling section of the transmission signal. Preferably the correlation calculation device calculates the correlation value of the low-intensity spectrum signals in the frequency rising section and the frequency falling section, from the low-intensity spectrum signal detected in the frequency rising section, the low-intensity spectrum signal detected in the frequency falling section, and the respective Doppler shift quantities calculated by the Doppler calculation device.

In the FM-CW radar apparatus, the frequency of the millimeter-wave band beam to be transmitted has a frequency rising section and a frequency falling section within a certain bandwidth. The reception signal reflected from a target object is detected with a time lag depending upon the distance between the radar apparatus and the target object. Therefore, in the signal obtained by mixing the transmission/reception signals, a beat signal with a frequency which is different in the frequency rising section and in the frequency falling section is detected. The beat signal however, causes a Doppler shift which is different in the frequency rising section and in the frequency falling section, depending on the moving speed of a vehicle.

With the radar apparatus having the above described construction however, the Doppler calculation device calculates the Doppler shift quantity of the received spectrum signal in the frequency rising section of the transmission signal and the Doppler shift quantity of the received spectrum signal in the frequency falling section of the transmission signal, from the vehicles own speed detected by the vehicle speed device mounted on the vehicle. The correlation calculation device calculates the correlation value based on respective Doppler shift quantities in the frequency rising section and the frequency falling section at the time of calculating the correlation value. Therefore, even if the frequency of the FM wave rises or falls between two points to be detected or the vehicles own speed changes, the correlation value can be corrected to perform accurate judgement.

BRIEF DESCRIPTION OF THE DRAWINGS

FIG. 8 is diagrams for explaining a signal waveform in each step in the above flowchart. Of these.

FIG. 9 is diagrams for explaining a signal waveform in each step in the flowchart shown in FIG. 7. Of these.

DESCRIPTION OF THE PREFERRED EMBODIMENTS

Figure 10:
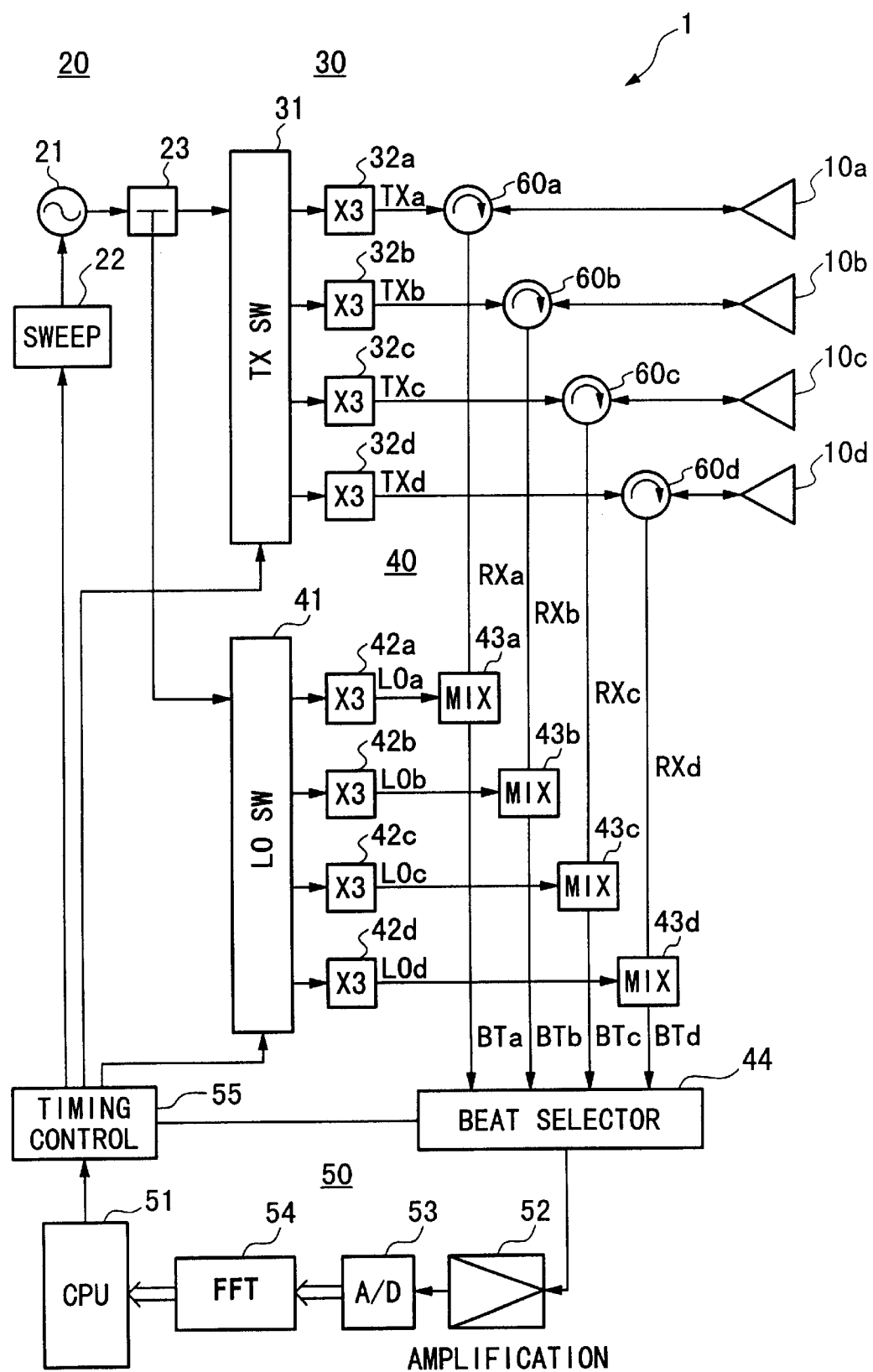
FIG. 10 is a block diagram for explaining the construction of the overall radar apparatus according to the present invention.

A radar apparatus according to the present invention will now be described with reference to the accompanying drawings. In FIG. 10 is shown as a block diagram, an overall construction of a time-division type FM-CW multi-beam radar apparatus which is one embodiment of the present invention. The radar apparatus 1 comprises four antennas 10a to 10d, an FM wave generation circuit 20, a transmission section 30 having a four-channel construction, a reception section 40 having a four-channel construction, a detection/control section 50, and four directional couplers 60a to 60d.

The antennas 10a to 10d comprise an offset defocus parabolic multi-beam antenna or the like, having a radiating pattern of a radiating beam having a spatially partially overlapping portion. The FM wave generation circuit 20 comprises a voltage-controlled oscillator 21 for generating a radio wave in a submillimeter wave band of for example 20 GHz or 25 GHz, a sweep circuit 22 for supplying modulation voltage of a triangular wave form to the voltage-controlled oscillator 21, and a power dividing circuit 23 for dividing the modulated power to the transmission section 30 and the reception section 40. The transmission section 30 comprises a transmission switching circuit 31 for switching the modulated power to each antenna at a predetermined timing, and frequency multiplication circuits 32a to 32d for multiplying the transmitted modulated power by three and converting this to an FM wave in the millimeter-wave band such as 60 GHz or 75 GHz.

The reception section 40 comprises a local switching circuit 41 for switching a local modulation power divided by the power separating circuit 23, thrice multiplication circuits 42a to 42d for converting the local modulation power into the same frequency as that of the transmitted modulation power, mixing circuits 43a to 43d, and a beat selector 44. The detection/control circuit 50 comprises a processing unit (CPU) 51, an amplification circuit 52, an A/D conversion circuit 53, a fast Fourier transform circuit (FFT) 54, and a timing control circuit 55.

Transmit-beams Txa to Txd modulated to FM waves in the millimeter-wave band of for example 60 GHz pass through the directional couplers 60a to 60d, and are supplied to antennas 10a to 10d at different timing, and radiated from the antennas to a target object.

Of the transmit-beams Txa to Txd radiated from the antennas 10a to 10d, the transmit-beams reflected by the target object are received by the antennas 10a to 10d as reflected waves Rxa to Rxd, separated from the transmission wave by the directional couplers 60a to 60d and input to the reception section 40, and synthesized with local FM modulation waves Loa to Lod at a predetermined timing by the mixing circuits 43a to 43d to generate beats Bta to Btd in the synthesized signal. The beat selector 44 then sequentially selects the beat signals Bta to Btd output from the mixing circuits 43a to 43d, and outputs them to the detection/control circuit 50.

The beat signals Bta to Btd output to the detection/control circuit 50 are amplified by the amplification circuit 52, then converted into digital form by the A/D conversion circuit 53, frequency-converted by the fast Fourier transform circuit (FFT) 54, and output to the processing unit (CPU) 51 as a power spectrum having a peak in the frequency corresponding to the beat frequency.

The processing unit 51 calculates the propagation delay time of the FM wave with respect to the spectral frequency having a power intensity not less than a certain level, from each input power spectrum, and calculates the distance to the target object based thereon. Moreover, the processing unit 51 calculates the azimuth of the target object from the peak intensity of each power spectrum, by a weighted averaging processing, and determines the position of the target object from the calculated distance and azimuth.

Figure 3:
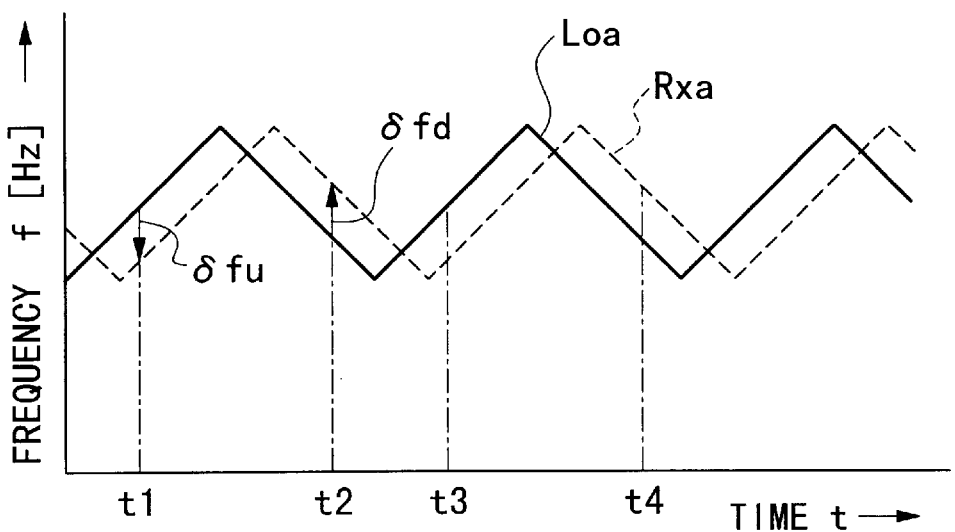
FIG. 3 is a graph for explaining the relation between transmission and reception waves observed at the time of stopping or travelling at a low speed, in a CW-FM radar apparatus.

For example, FIG. 3 conceptually shows the relation between a local wave (dispatched wave) Loa and received wave Rxa, when a target object arranged at a certain distance is observed in a state with a vehicle stopped or travelling at a low speed, taking frequency along the vertical axis and time along the horizontal axis. In a state with a low relative speed between the vehicles, only a time lag component until the transmitted beam is reflected by the target object and received operates between the transmission wave and the reception wave. Hence as shown in FIG. 3, the frequency difference δfu of the transmission/reception waves in the frequency rising section of the FM wave (for example, at a time $t_1$ in FIG. 3) and the frequency difference δfd of the transmission/reception waves in the frequency falling section (for example, at a time $t_2$ in FIG. 3) becomes roughly the same certain value. In the synthesized signal obtained by synthesizing these transmission/reception waves by means of the mixing circuit, there is generated a beat signal Bta with a frequency corresponding to the frequency difference $\delta fu \approx \delta fd$.

Since the frequency difference of the transmission wave and the reception wave represents a propagation delay time of the FM wave, the closer the target object, the smaller the frequency difference, and the farther the target object, the larger the frequency difference. Therefore this frequency difference, that is the frequency of the beat signal Bta in the synthesized signal becomes lower as the target object becomes closer, and becomes higher as the target object becomes farther away. Hence, the distance to the target object can be calculated by analyzing the frequency of the beat signal Bta.

Figure 4A:
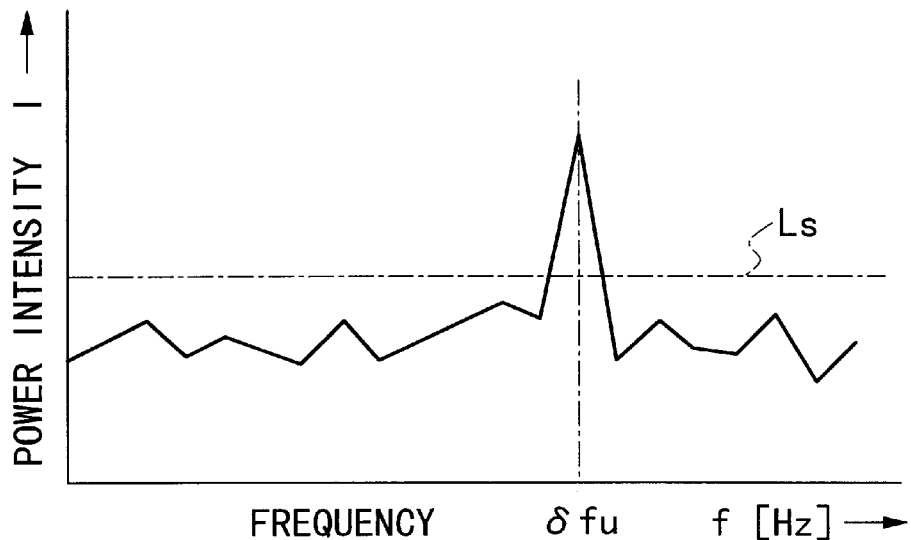
FIGS. 4A and 4B show power spectrums obtained by performing a Fourier transform on the transmission/reception waves at the time $t_1$ and the time $t_2$ in FIG. 3.
Figure 4B:
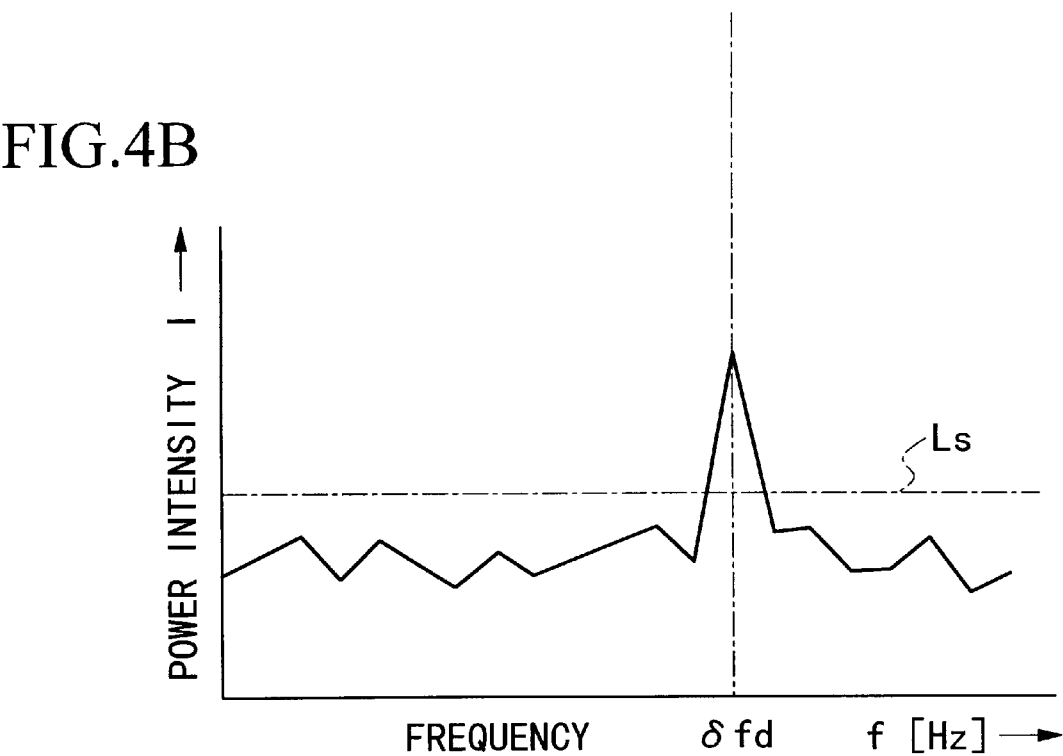

FIGS. 4A and 4B show the power spectrum obtained by frequency-converting the beat signal Bta sampled at a time $t_1$ (FIG. 4A) and $t_2$ (FIG. 4B), respectively, by the fast Fourier transform circuit 54, which in this condition is detected as a waveform having a peak roughly at the same frequency. The processing unit 51 picks out a spectral component having a peak intensity exceeding a certain threshold level Ls (shown by the alternate long and short dash line in FIG. 4) from the power spectrum measured in this manner, and calculates the distance to the target object, from this frequency (hereinafter referred to as a "peak frequency").

The low-intensity spectrum signal not higher than the above described threshold level Ls is a signal which has heretofore been excluded (noise processed) as not being significant information for the target object, as described above. However in this signal, other than a so-called noise component, there is included a spectrum signal of a weak reflected wave of the transmitted beam. For example, reflected spectrum signals from a roadbed, an object scattered on the roadbed, a reflective mirror laid in the roadbed in the center of the road, difference in level on the shoulder of the road and the like (referred to as "roadbed reflective signal") correspond thereto, and differ according to respective distance, reflective area and the vehicles own speed. Therefore these become a power spectrum having weak power dispersed over a generally wide frequency band.

The roadbed reflective signal however has information peculiar to the road environment where the vehicle travels, and on the detected power spectrum there can be found a definite regularity corresponding to the road environment being traveled.

Therefore, the radar apparatus of the present invention gives attention to the regularity found in this manner, and judges if the sensitivity of the transmission/reception circuit of the radar apparatus has dropped or not, depending upon whether or not the sensitivity lies within the predetermined regularity.

Figure 1:
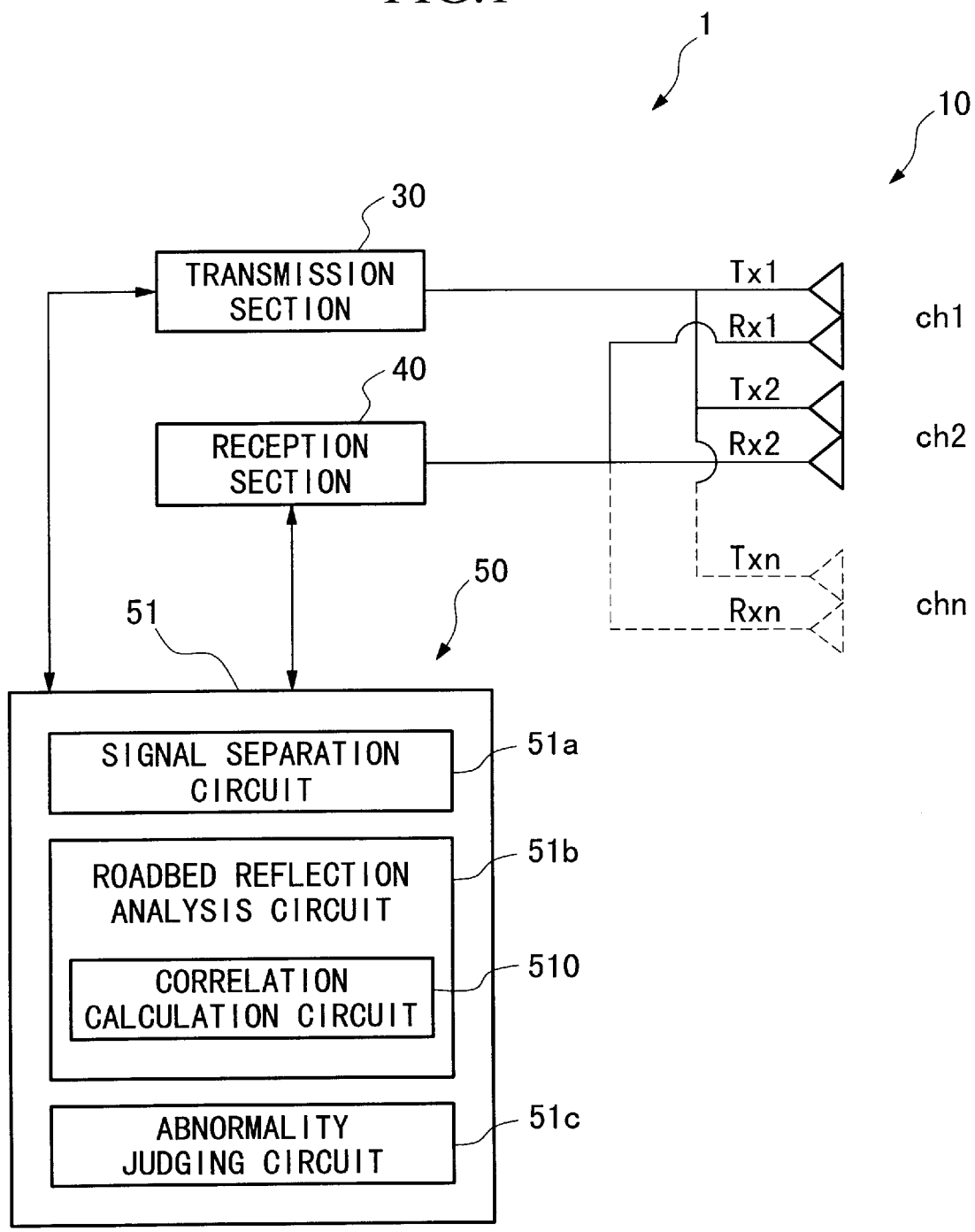
FIG. 1 is a block diagram showing a construction of an embodiment of a radar apparatus according to the present invention.

With the embodiment of the radar apparatus according to the present invention, as shown in outline in the block diagram of FIG. 1 of the multi-beam radar apparatus, a processing unit 51 in a radar apparatus 1 comprises a signal separation circuit 51a for separating a low-intensity spectrum signal not higher than a certain intensity level, a roadbed reflection analysis circuit 51b having a correlation calculation circuit 510 for calculating the correlation value of the low-intensity spectrum signal at two separated times, and an abnormality judging circuit 51c for performing abnormality judgement of the radar apparatus based on the analysis results of the roadbed reflection analysis circuit 51b.

When it is judged from the correlation value between the two low-intensity spectrum signals calculated by the correlation calculation circuit 510 in the roadbed reflection analysis circuit 51b that the correlation between them is low, the abnormality judging circuit 51c judges that the radar apparatus is abnormal.

That is to say, in a state where the transmission/reception circuit of the radar apparatus has normal sensitivity, the low-intensity spectrum signal detected at two optional times in the same roadbed travelling state has a power spectrum peculiar to each of the travelling roadbeds. Hence, a certain correlation can be found between these. However, if the radar apparatus does not have normal sensitivity, and the low-intensity spectrum signal is a noise component, these two low-intensity spectrum signals are dispersed, and the correlation between them becomes very low.

With this embodiment, the signal separation circuit 51a in the processing unit 51 takes out a low-intensity spectrum signal $Ps_1$ not higher than a threshold level Ls from the power spectrum at a time $t_1$ shown in FIG. 4A, and takes out a low-intensity spectrum signal $Ps_2$ from the power spectrum at a time $t_2$ shown in FIG. 4B in the same manner, and outputs these to the roadbed reflection analysis circuit 51b. The correlation calculation circuit 510 in the roadbed reflection analysis circuit 51b calculates the correlation value of the input two low-intensity spectrum signals. For example, the spectrum $Ps_2$ at the time $t_2$ is subtracted from the spectrum $Ps_1$ at the time $t_1$, or the cross-correlation between the two signals is calculated to calculate the cross-correlation function.

The abnormality judging circuit 51c judges that the radar apparatus is receiving a roadbed reflection signal and that the transmission/reception sensitivity is normal when it is judged from the correlation value calculated in the above manner, that there is a certain correlation between two low-intensity spectrum signals, for example when $Ps_1$–$Ps_2$ in the above example is within a certain dispersion width. Moreover, when it is judged that there is no correlation between them, for example, when the above described $Ps_1$–$Ps_2$ exceeds the certain dispersion width, it is judged that the radar apparatus is not receiving the roadbed reflection signal accurately and that the transmission/reception sensitivity is dropping.

The abnormality judging circuit 51c performs the above described abnormality judgement for each combination circuit of the transmission circuit 30 and the reception circuit 40 which constitute the multi-beam radar. When there is a combination circuit which is judged to be abnormal, the abnormality judging circuit 51c specifies the circuit and outputs an abnormality signal to the processing unit 51.

The processing unit 51 which has received the above described abnormality judging signal, displays a warning to the effect that there is an abnormality in the radar apparatus 1 (or as required, up to the combination circuit in which the abnormality has been found) in a place which can be easily checked by the passenger, such as an instrument panel of the vehicle. The processing unit 51 can calculate the position of the target object by excluding the data in the combination circuit which is abnormal.

Therefore, with the radar apparatus described above, an abnormality in the transmission/reception circuit of the radar apparatus can be judged, without transporting the vehicle to a special environment, and even in a road environment where a significant target object cannot be found (no spectrum having a power of a threshold level or higher on the power spectrum). Moreover, since the position of the target object can be calculated by excluding the data according to need, problems due to the abnormality can be prevented.

In a state with a vehicle mounted with an FM-CW radar apparatus and travelling at high speed, the reception wave is affected by the Doppler effect, as described below. Hence different power spectrum are detected in the FM frequency rising section and the FM frequency falling section. However, it is possible for the processing unit 51 to judge abnormality in the same manner in the above described construction, by selecting a power spectrum, for example, between frequency rising sections such as time $t_1$ and time $t_3$ in FIG. 3, or between the frequency falling sections such as time $t_2$ and time $t_4$, and constituting the correlation calculation circuit 510 so as to calculate the correlation value with respect to the low-intensity spectrum signals in these equivalent sections.

For example, a time interval dt of the data sampling is taken as a reference for selecting these two points, and a limitation is made so that the time interval dt is within the same rising section, or the setting is such that the time interval dt extends over the adjacent rising sections (for example, so as to be the same as the period of the FM frequency). Then, these two points are swept in sequence, to thereby enable continuous measurement.

Figure 5:
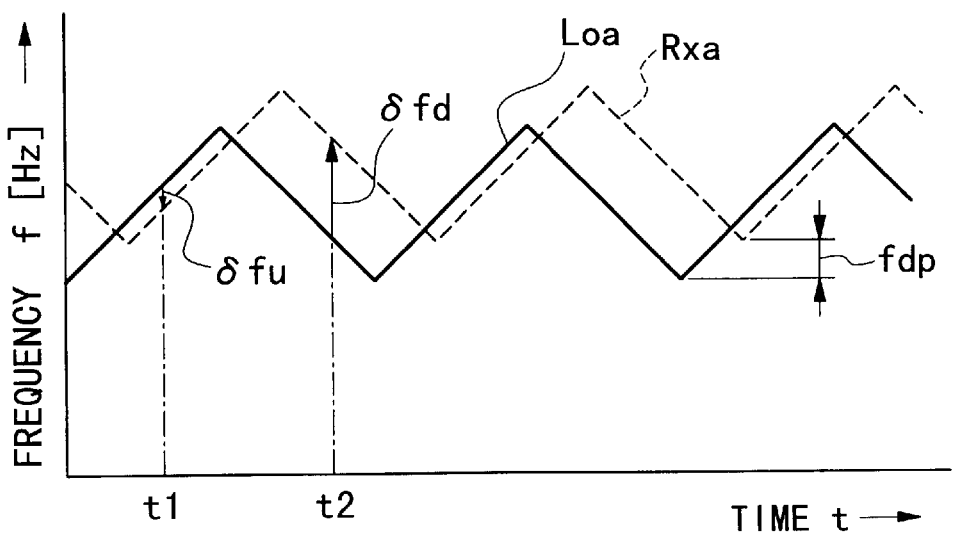
FIG. 5 is a graph for explaining the relation between transmission and reception waves observed at the time of travelling at a high speed, in a CW-FM radar apparatus.

Next, FIG. 5 shows the relation between the transmission wave (local wave) Loa and the reception wave Rxa when a target object and the radar apparatus move close to each other with a relative speed, for example, when a vehicle travels toward a stationary target object at a certain speed. At this time, the reception wave Rxa, as with the case of FIG. 3, has a propagation delay time depending on the distance between the target object and the radar apparatus. However in this situation, at the same time a Doppler shift fdp proportional to the approaching speed of the vehicle is produced, thereby shifting the reception wave Rxa in the direction of increasing frequency f.

As a result, the frequency difference δfu of the transmission/reception waves in the frequency rising section (for example, time $t_1$) and the frequency difference δfd of the transmission/reception waves in the frequency falling section (for example, time $t_2$) which have been the same in a state with both of the target object and the radar apparatus stationary, become different as shown in FIG. 5, having a relation of δfu<δfd δfd (when the relative distance is increasing, δfu>δfd).

Figure 6A:
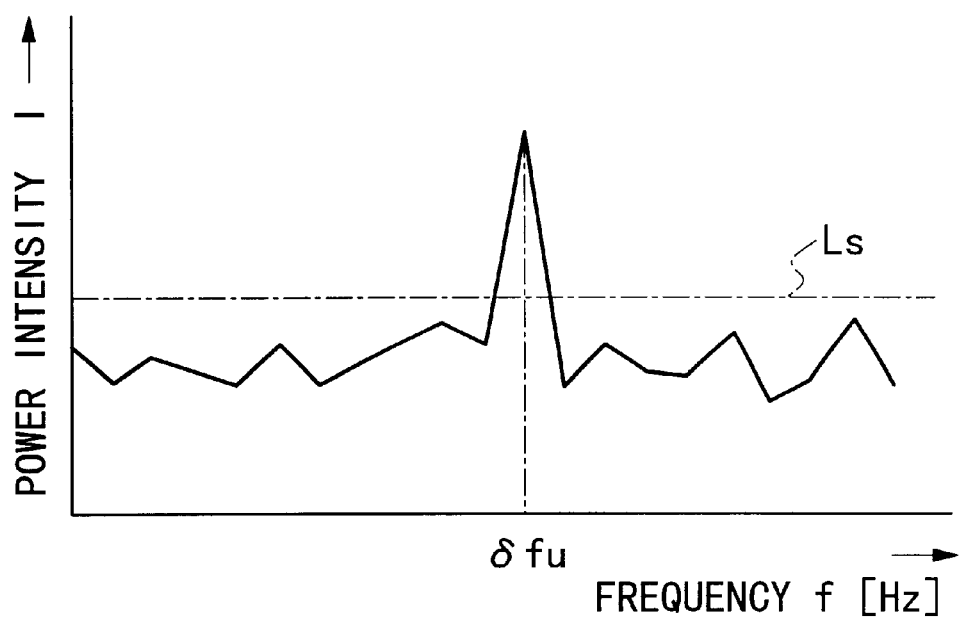
FIGS. 6A and 6B show power spectrums obtained by performing a Fourier transform on the transmission/reception waves at the time $t_1$ and the time $t_2$ in FIG. 5.
Figure 6B:
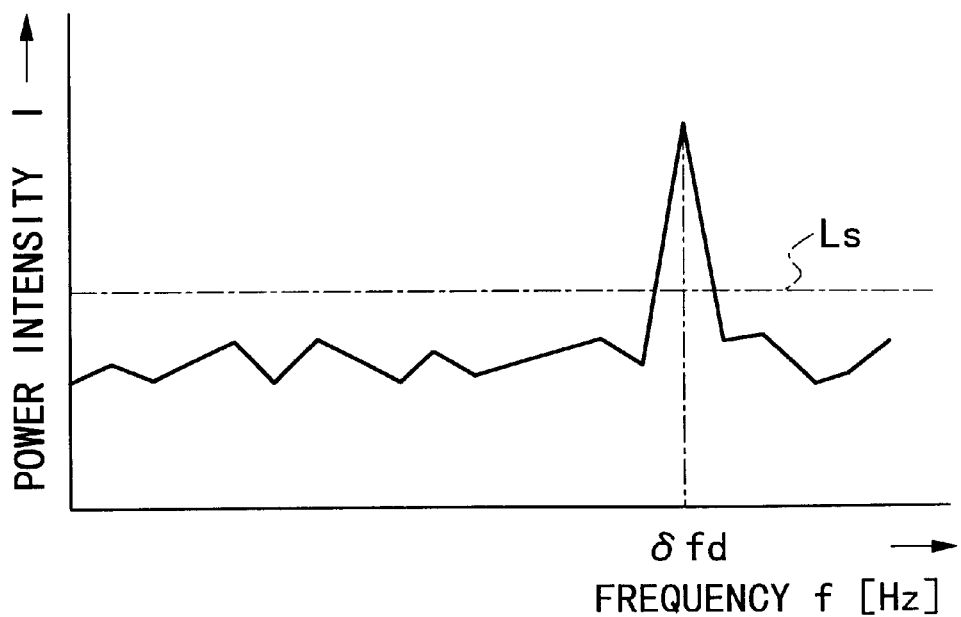

Therefore, the peak frequency of the power spectrum into which the beat signal Bta observed at the two times is FFT transformed, respectively, will be detected such that though the relative position of a vehicle and a target object hardly changes and is roughly the same within the frequency rising/falling time (times $t_1$ and $t_2$). Further, as shown in FIGS. 6A and 6B, the peak frequency at time $t_1$ which is the frequency rising section (FIG. 6A) is low, and the peak frequency at time $t_2$ which is the frequency falling section (FIG. 6B) is high.

Accordingly, the problem arises in that when the position of a target object is calculated in the same way from the detected peak frequency, not depending upon the frequency rising section or falling section, the target object may be recognized as two objects at different distances or as an object having a large width in the length direction, though this is actually one target object.

The problem of the Doppler shift fdp depending on the vehicles own speed is caused not only with a target object having a peak frequency as described above, but also in the whole area of the frequency domain detection of the power spectrum detected by the FM-CW radar apparatus, and similarly with the low-intensity spectrum signal described above.

Figure 2:
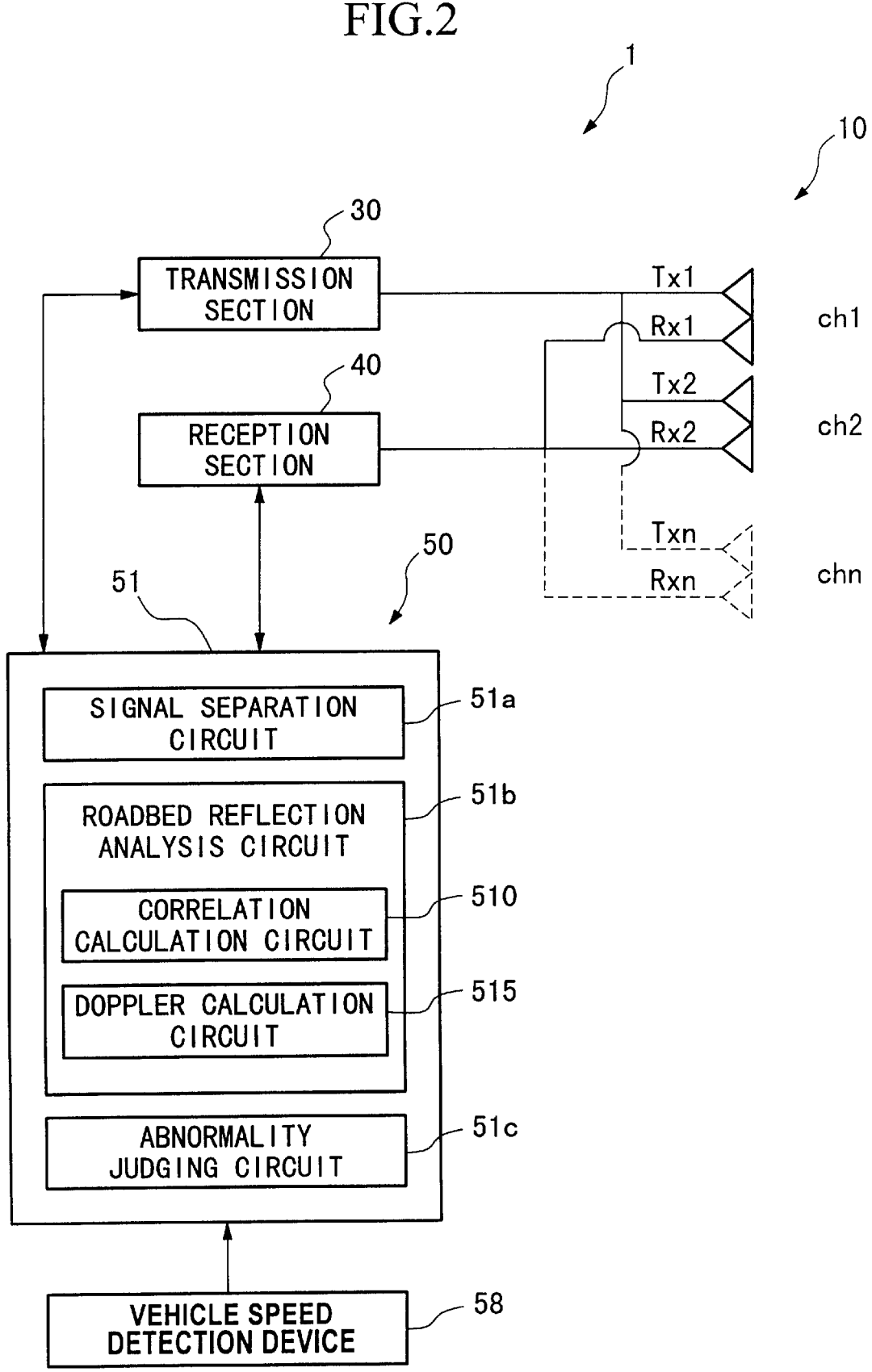
FIG. 2 is a block diagram showing a construction of another embodiment of a radar apparatus according to the present invention.

With an other embodiment of a radar apparatus according to the present invention, as shown in outline in FIG. 2 showing a block diagram of a multi-beam radar apparatus of this embodiment, a radar apparatus 1 comprises, in addition to the radar apparatus of the embodiment described above, a vehicle speed detection device 58 for detecting the moving speed of a vehicle (vehicles own speed). Moreover, the roadbed reflection analysis circuit 51*b* in the processing unit 51 includes a Doppler calculation circuit 515 for calculating the Doppler shift quantity produced corresponding to the vehicles own speed.

The vehicles own speed detected by the vehicle speed detection device 58 is output to the processing unit 51, and input to the roadbed reflection analysis circuit 51*b* in the processing unit 51. The Doppler calculation circuit 515 in the roadbed reflection analysis circuit 51*b* respectively calculates the Doppler shift quantity of the received spectrum signal in the frequency rising section of the transmission signal and the Doppler shift quantity of the received spectrum signal in the frequency falling section of the transmission signal, from the vehicles own speed input in succession, and outputs these to the correlation calculation circuit 510.

The correlation calculation circuit 510 in the roadbed reflection analysis circuit 51*b*, when calculating the correlation value of the two low-intensity spectrum signals input from the signal separation circuit 51*a* as described above, performs computational processing of the correlation between signals based on the respective Doppler shift quantities of the two low-intensity spectrum signals calculated by the Doppler calculation circuit 515. When by a similar method to that described above, it is judged from the correlation results that there is no correlation higher than a certain level between the two low-intensity spectrum signals, the abnormality judging circuit 51*c* judges that the radar apparatus 1 is abnormal.

Figure 7:
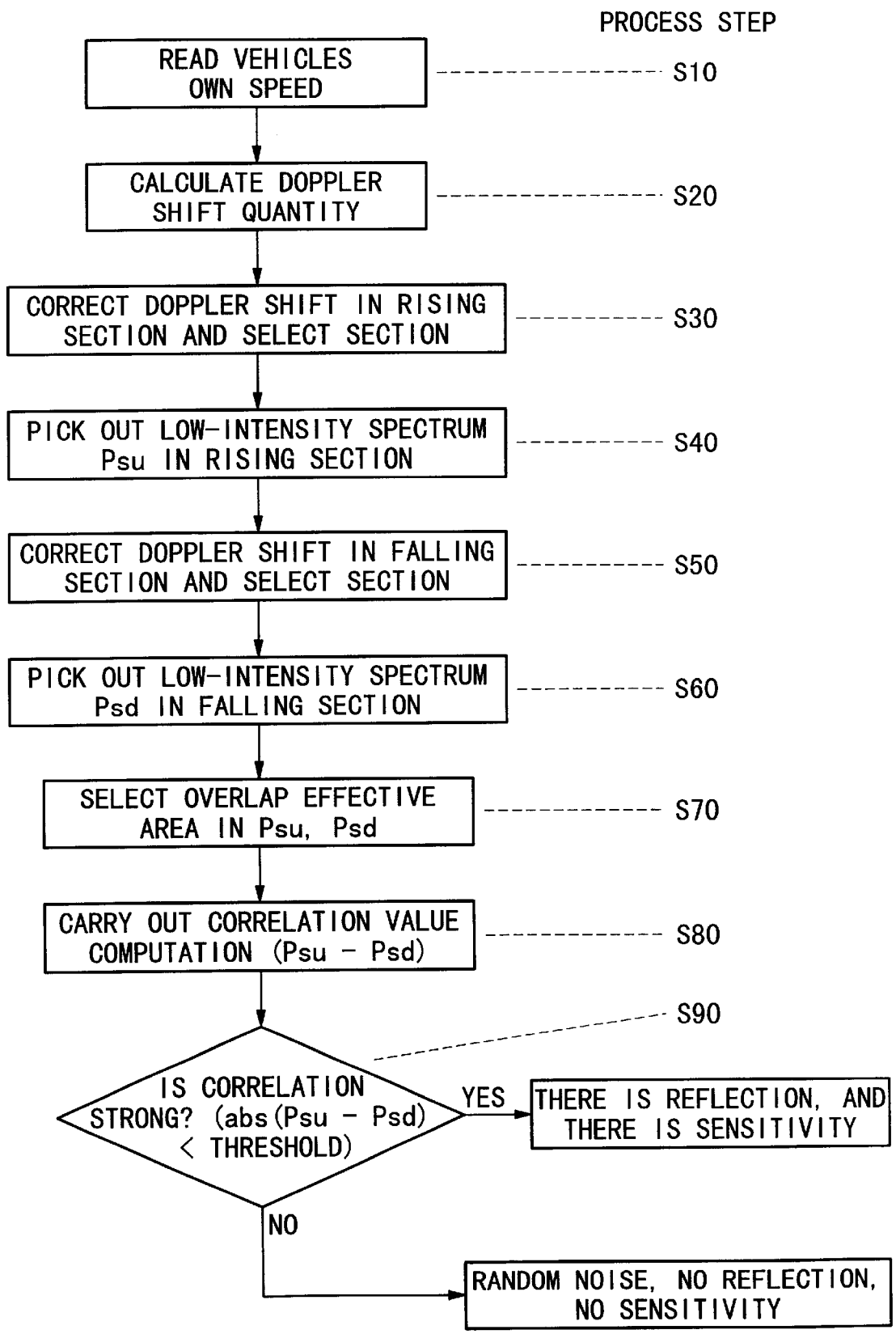
FIG. 7 is a flowchart illustrating the flow of signal processing in the radar apparatus of the above embodiment.
Figure 8A:
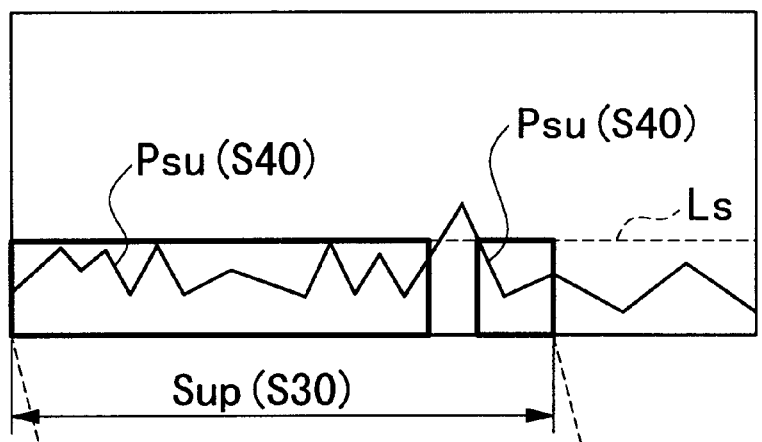
FIG. 8A shows a power spectrum observed in an FM frequency rising section.
Figure 8B:
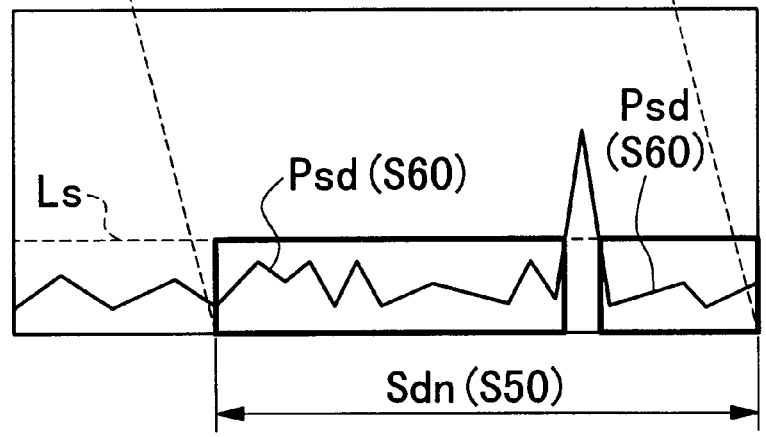
FIG. 8B shows a power spectrum observed in an FM frequency falling section, which conceptually show the Doppler shift relationship between the two.

The operation of the radar apparatus 1 of this embodiment will be described in detail with reference to the drawings. FIG. 7 shows a flowchart of the signal processing in the processing unit 51 of the radar apparatus 1, and FIG. 8 shows a processing waveform in each step shown in the processing flow (shown by a processing step number). In the following, the description is for the case where the sampling of the distance data for calculating the above described correlation value is carried out at two points in the FM frequency rising section and falling section.

First, the processing unit 51 sequentially reads the vehicles own speed output from a vehicle speed device 58, for example a speedometer of the vehicle, for each sampling (step S10). From the vehicles own speed, the processing unit 51 calculates the Doppler shift quantity respectively for the FM frequency rising section and the FM frequency falling section (in the figure, each is denoted simply by "rising section" and "falling section") by means of the Doppler calculation circuit 515 (step S20).

The roadbed reflection analysis circuit 51*b* corrects the Doppler shift quantity calculated in the above step 20, with respect to the rising section power spectrum which is sampled in the frequency rising section, FFT-transformed by the fast Fourier transform circuit 54 and input to the processing unit 51, and the falling section power spectrum which is sampled in the frequency falling section, and input to the processing unit 51 in the same manner, and selects the overlap sections Sup and Sdn of both spectra. Then, the signal separation circuit 51a picks out two low-intensity spectrum signals Psu and Psd not higher than a threshold level Ls by means of (steps S30 to S60, FIGS. 8A and 8B).

Figure 9A:
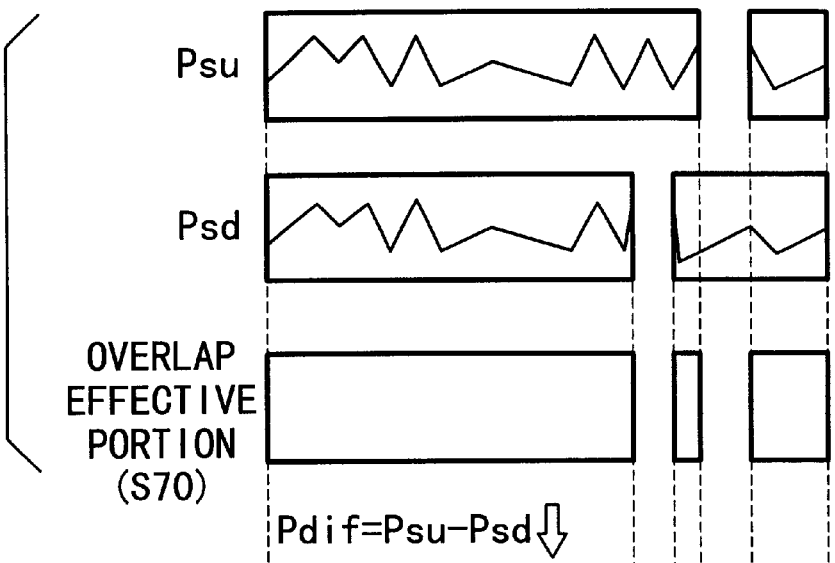
FIG. 9A shows states where the Doppler shift correction is performed and the low-intensity spectrum signal is picked out.

The correlation calculation circuit 510 sets, from a low-intensity spectrum signal Psu picked out from the frequency rising section and a low-intensity spectrum signal Psd picked out from the frequency falling section, only an area where the effective portions of both signals are overlapping, as an effective correlation calculation area (step S70, FIG. 9A), and calculates the correlation value between the two low-intensity spectrum signals Psu and Psd for the area (step S80).

Figure 9B:
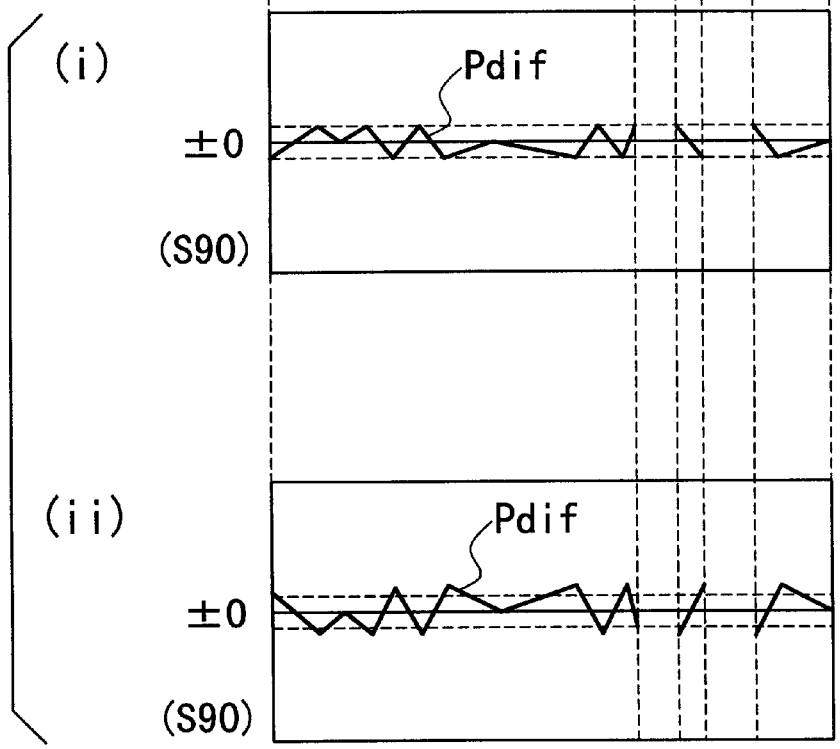
FIG. 9B shows a result of a correlation calculation with respect to an overlapping portion of the two in FIG. 9A, where (i) shows the case where the correlation between the two is strong, and (ii) shows a case where the correlation between the two is weak.

Here, FIG. 9B shows, as the correlation value, the calculation result carried out using Pdif=Psu−Psd as an evaluation reference. When a roadbed reflection signal is received and the correlation between the two low-intensity spectrum signals is strong, then as shown in (i), the dispersion width of Pdif (Psu−Psd) is small and can be accommodated in a certain dispersion width. However, when the reception sensitivity of the roadbed reflection signal is low, and the main component is random noise, the correlation between the two low-intensity spectrum signals becomes weak, and in this case, as shown in (ii), the dispersion width of Pdif becomes large.

Therefore, in the example of the above correlation calculation, the abnormality judging circuit 51c compares if the above dispersion width Pdif calculated by the correlation calculation circuit 510 is within a predetermined range set and stored in advance (shown by the dotted line in FIG. 9). For example, in a plurality of samplings, when the number of times the predetermined range is exceeded is a certain level or higher, the abnormality judging circuit 51c judges that the radar apparatus is abnormal (step S90).

Moreover, when the cross-correlation between the two low-intensity spectrum signals is calculated, for example, as a calculation method for the correlation, if the calculated cross-correlation coefficient is not higher than a predetermined coefficient value, the above described abnormality judgement is performed.

Furthermore, at the time of computing and judging the correlation between the above two low-intensity spectrum signals, not only the spectral whole width is compared, but also only a frequency band of the roadbed reflection component having a high contribution rate may be compared.

The abnormality judging circuit 51c performs the above described abnormality judgement for each combination circuit of the transmission circuit 30 and the reception circuit 40 which constitute the multi-beam radar. When there is a combination circuit which is judged to be abnormal, the abnormality judging circuit 51c specifies the circuit and outputs an abnormality signal to the processing unit 51.

The processing unit 51 which has received the above described abnormality judging signal, displays a warning to the effect that there is an abnormality in the radar apparatus 1 (or as required, up to the combination circuit in which the abnormality has been found) in a place which can be easily checked by the passenger, such as an instrument panel of the vehicle. The processing unit 51 can calculate the position of the target object by excluding the data in the combination circuit which is abnormal.

As described above, according to this embodiment, in addition to the effect by means of the above described embodiment, the correlation value between the low-intensity spectrum signals can be processed by the Doppler correction to obtain accurate judgement, even if the frequency of the FM wave rises or falls between two points to be sampled, or the vehicles own speed changes. Moreover as required, by excluding the data for a combination circuit which has been judged to be abnormal, and calculating the position of the target object, problems due to the abnormality can be prevented.

The case where a radar apparatus according to the present invention is applied to an FM-CW multi-beam radar apparatus which uses a radio frequency in the millimeter-wave band has been described above with reference to embodiments. However the present invention is not limited to the above embodiments, and is similarly applicable to, for example, a pulse radar apparatus and the before mentioned scan beam radar apparatus.

As described above, according to the present invention, with a radar apparatus used mounted on a vehicle and having: a beam transmission device for transmitting a beam; a beam reception device for receiving a signal reflected from a target object; and a processing unit for detecting a position of a target object from the transmission signal and the reception signal, the processing device has a roadbed reflection analysis device for analyzing from among the reception signals a roadbed reflection signal reflected from a roadbed, and incorporates an abnormality judging device for judging an abnormality of the beam transmission device or the beam reception device, based on the analysis results of the roadbed reflection analysis device.

An abnormality in the radar apparatus is judged based on whether a reflection from a roadbed is detected or not, by analyzing from among reception signals a roadbed reflection signal reflected from the roadbed. Hence, abnormality in the radar apparatus can be detected and judged during travelling, without transporting and setting a vehicle in a special measurement environment to measure the sensitivity, and without depending upon the road environment, such as the presence or absence of a target object normally serving as a target of the radar apparatus.

With the radar apparatus which detects the position of a target object by using the transmission signal and the reception signal and performing frequency conversion processing, the processing unit has a signal separation device for separating a low-intensity spectrum signal not higher than a previously set predetermined intensity level, from among the frequency-conversion processed received spectrum signals. Preferably the roadbed reflection analysis device analyzes the separated low-intensity spectrum signal as the roadbed reflection signal.

The low-intensity spectrum signal peculiar to the reflection signal from the roadbed can be separated and analyzed, and the power spectrum can be compared with the roadbed reflection signal data stored in the memory to judge the abnormality.

Furthermore, the roadbed reflection analysis device is further provided with a correlation calculation device for calculating a correlation value between the low-intensity spectrum signal at optional one time and the other low-intensity spectrum signal at another time. The abnormality judging device preferably judges an abnormality in the beam transmission device or the beam reception device, based on the calculated correlation value.

The correlation calculation device calculates the correlation value between low-intensity spectrum signals in very small intervals, and the abnormality judging device judges that the radar apparatus is abnormal, when the correlation between them is low. Therefore, it can be judged if the transmission and reception sensitivity of the radar apparatus is normal or not in an optional roadbed situation, without storing and comparing a large amount of data in the memory.

Moreover, the radar apparatus comprises a vehicle speed detection device for detecting the moving speed of the vehicle, and the roadbed reflection analysis device further has a Doppler calculation device for calculating the Doppler shift quantity caused by the vehicles own speed at the time of respective sampling, with respect to the two low-intensity spectrum signals whose correlation value is calculated. Desirably the correlation calculation device calculates the correlation value based on these Doppler shift quantities.

Even if the vehicles own speed varies between the two points where the low-intensity spectrum signal is detected, this can be corrected, and the error in the correlation value can be corrected to perform accurate judgement.

Moreover, in the case of an FM-CW radar apparatus in the millimeter-wave band, the radar apparatus further comprises a Doppler calculation device for calculating the Doppler shift quantity of the received spectrum signal in a frequency rising section of the FM-modulated transmission signal and the Doppler shift quantity of the received spectrum signal in a frequency falling section of the transmission signal. Preferably the correlation calculation device calculates the correlation value of the low-intensity spectrum signals in the frequency rising section and the frequency falling section, from the low-intensity spectrum signal detected in the frequency rising section, the low-intensity spectrum signal detected in the frequency falling section. The respective Doppler shift quantities calculated by the Doppler calculation device.

The Doppler calculation device calculates the Doppler shift quantity of the received spectrum signals in the frequency rising section and the frequency falling section, from the vehicles own speed detected by the vehicle speed device. The correlation calculation device calculates the correlation value by correcting respective Doppler shift quantities in the frequency rising section and the frequency falling section at the time of calculating the correlation value. Therefore, even if the frequency of the FM wave rises or falls between two points to be detected or the vehicles own speed changes, the correlation value can be corrected to perform accurate judgement.

What is claimed is:

1. A radar apparatus mounted on a vehicle, comprising:

a beam transmission device for radiating a beam as a transmission signal;

a beam reception device for receiving a reception signal reflected from a target object which is within a radiation range of said radiated beam; and a processing unit for detecting the position of said target object from said transmission signal and said reception signal, wherein said processing unit has a roadbed reflection analysis device for analyzing from among the reception signals, a roadbed reflection signal reflected from a roadbed, and incorporates an abnormality judging device for judging an abnormality of said beam transmission device or said beam reception device, based on the analysis results of said roadbed reflection analysis device, and wherein said processing unit detects the position of said target object by using said transmission signal and said reception signal and performing frequency conversion processing to produce an intensity spectrum of all received signals, said processing unit comprises a signal separation device for separating a low-intensity spectrum signal not higher than a previously set predetermined intensity level from among all received spectrum signals which have been frequency-conversion processed by said processing unit, and said roadbed reflection analysis device analyzes said separated low-intensity spectrum signal as the roadbed reflection signal.

2. A radar apparatus according to claim 1, wherein said roadbed reflection analysis device is further provided with a correlation calculation device for calculating a correlation value between said low-intensity spectrum at one time and another low-intensity spectrum signal at another time, and said abnormality judging device judges an abnormality in said beam transmission device or said beam reception device based on said calculated correlation value.

3. A radar apparatus according to claim 2, wherein said vehicle has a vehicle speed detection device for detecting the moving speed of said vehicle, and said roadbed reflection analysis device further has a Doppler calculation device for calculating a Doppler shift quantity of said received spectrum signal calculated from the moving speed at said one time, and a Doppler shift quantity of said another received spectrum signal calculated from the moving speed at said another time, and said correlation calculation device calculates said correlation value based on the Doppler shift quantity at said one time and the Doppler shift quantity at said another time.

4. A radar apparatus according to claim 2, wherein said radar apparatus is an FM-CW radar apparatus in the millimeter-wave band, said vehicle has a vehicle speed detection device for detecting the moving speed of said vehicle, and said roadbed reflection analysis device has a Doppler calculation device for calculating from said detected moving speed of the vehicle, the Doppler shift quantity of said received spectrum signal in a frequency rising section of the transmission signal of said FM-modulated beam, and the Doppler shift quantity of said received spectrum signal in a frequency falling section of said transmission signal, and said correlation calculation device calculates the correlation value of said low-intensity spectrum signals in said frequency rising section and said frequency falling section, from said low-intensity spectrum signal detected in said frequency rising section, said low-intensity spectrum signal detected in said frequency falling section, and the respective Doppler shift quantities calculated by said Doppler calculation device.

* * * * *